UNITED STATES PATENT OFFICE.

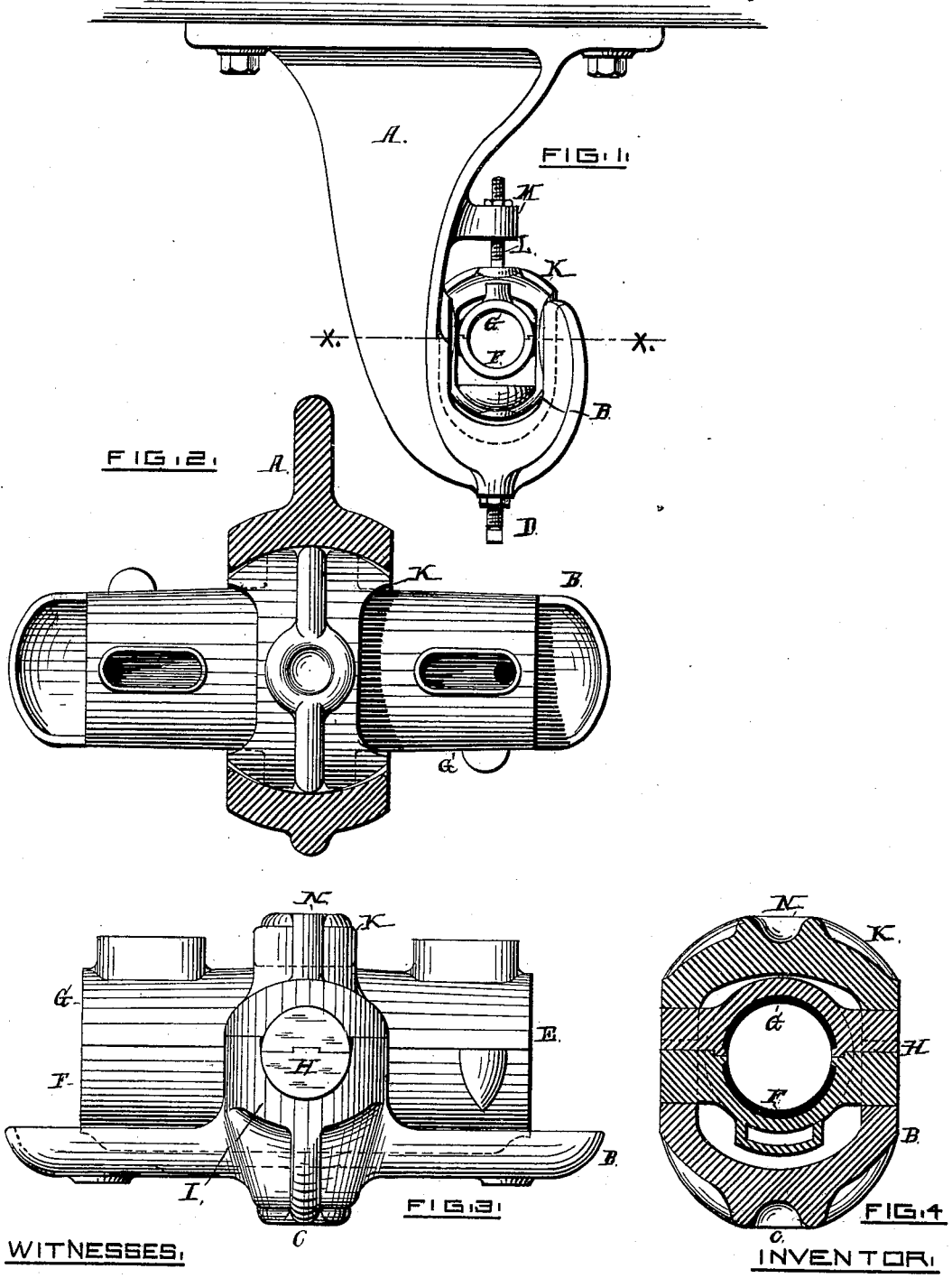

EVERETT G. GIBSON, OF PROVIDENCE, RHODE ISLAND.

SHAFT-HANGER.

SPECIFICATION forming part of Letters Patent No. 258,572, dated May 30, 1882.

Application filed January 20, 1882. (No model.)

*To all whom it may concern:*

Be it known that I, EVERETT G. GIBSON, of Providence, in the State of Rhode Island, have made certain new and useful Improvements in Shaft-Hangers; and I do hereby declare that the following specification, taken in connection with the drawings making a part of the same, is a full, clear, and exact description thereof.

Figure 1 is a side view of my improved hanger of the shaft. Fig. 2 is a top view of the bearing-frame, the supporting-frame being shown in section on line $x$ $x$. Fig. 3 is a side view of bearing-sleeve and oil-pan. Fig. 4 is a transverse section through center of same.

My improvements relate to what is known as a "J" hanger, and consist in the construction and arrangement of the automatically-adjusting sleeve and oil-pan, as hereinafter described, and pointed out in the claim.

In the drawings, A is the J-shaped frame or support, within which the other parts rest.

B is the oil or drip pan, having upon its under side a shallow socket, C, for the reception of the upper end of the set-screw D, upon which the pan B is supported.

E is the sleeve which supports the shaft, and through which it passes. The sleeve E is for convenience divided longitudinally into two parts, F and G, which are provided at the center, upon either side, with a lug, H. The pan B is provided upon either side with ears I, which are cut out and form a bearing for the lugs H of the sleeve.

K is a cap extending over the sleeve E and covering the lugs H, and is held in place by a set-screw, L, working in an arm, M, and resting, when turned up, in a shallow socket, N. The ends of the set-screws D and L, resting in the sockets C and N, respectively, are rounded off, and the inside of the J-shaped frame is concaved to receive the ears I, which are oval or convex, and secure a rocking and laterally swinging movement of the parts.

In putting together the several parts the oil-pan B is first placed in position, resting upon the end of the screw D, and sufficiently raised from the frame to admit of the rocking and laterally-swinging motion referred to, after which the under part, F, of the sleeve is placed in its bearings in the ears I of the pan B, and the whole adjusted by means of the screw D with reference to the shaft. The upper part, G, of the sleeve E is now placed over and the shaft inclosed between the two parts, which come together, as shown in Figs. 2, 3, and 4. The curved cap K is now placed over the sleeve, the ends of which partially surround the lugs H, and correspond to and rest upon the ears I, as shown in Figs. 1, 2, 3, and 4. The screw L is now turned down until it comes in contact with the cap K and holds the parts securely in place.

It will now be readily seen that while the parts are securely held in place they are capable of adjustment through the set-screws D L whenever adjustment is required, and that the sleeve, with its pan, is also capable of a rocking and laterally-swinging movement which will secure its automatic adaptation to the shaft at all times.

The sleeve E may be made solid, if desired; but I make it in two pieces for convenience in assembling and adjusting the several parts.

What I claim as my invention, and desire to secure by Letters Patent, is—

The combination, with a suitable hanger, A, having arm M, and securing devices D L, of the sleeve E, having lugs H, drip-pan B, having ears I and socket C, and the cap K, having socket N, the cap extending over the sleeve and covering the lugs with the ears, so as to form a bearing, and the sockets receiving the ends of the securing devices, as set forth.

EVERETT G. GIBSON.

Witnesses:
JOHN J. COLTON,
EDGAR G. DURFEE.